July 12, 1960 M. FAU 2,944,674
BAGGAGE RACK
Filed Nov. 7, 1957

United States Patent Office 2,944,674
Patented July 12, 1960

2,944,674
BAGGAGE RACK

Maurice Fau, 32 Ave. Raymond Poincare, La Varenne Saint-Hilaire, France

Filed Nov. 7, 1957, Ser. No. 695,030

Claims priority, application France Nov. 8, 1956

2 Claims. (Cl. 211—90)

This invention relates to luggage racks, and especially those used in railway cars. Racks of this kind generally include one or more flat carrier elements upon which bags and the like can be rested, said carrier elements being supported from a vertical wall of the compartment by means of brackets.

Heretofore the carrier elements were usually provided in the form of perforate metallic gratings or the like. Such elements are relatively expensive to make, difficult to attach to the supports and inconvenient in use because any projections present on the bags tend to get caught in the perforations of the carrier elements. Objects of this invention accordingly include the provision of luggage carrier elements which are relatively simple and economical to make and mount, easily replaceable, and more convenient in that they provide a smooth carrier surface over which the supported objects will slide more easily and which will be less liable to wear and tear.

A baggage-rack according to this invention includes a carrier element comprising a continuous smooth plate of sheet material integrally formed or provided along opposite longitudinal sides thereof with a pair of sleeves adapted to be threaded over respective supporting bars or tubes forming part of a supporting structure.

The sleeves are preferably moulded integrally with the carrier element, although they may be welded or fused thereto.

One exemplary embodiment of the invention is illustrated in the accompanying drawings, given by way of illustration but not of limitation, wherein.

Figure 1:
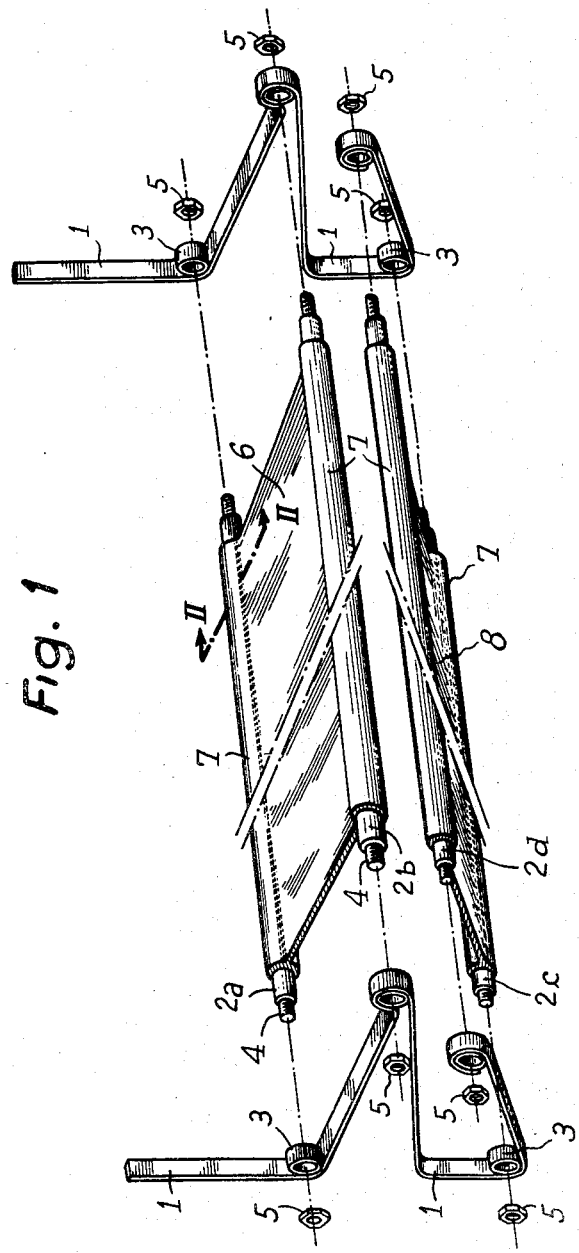
Fig. 1 is an exploded perspective view of a luggage rack assembly.
Figure 2:
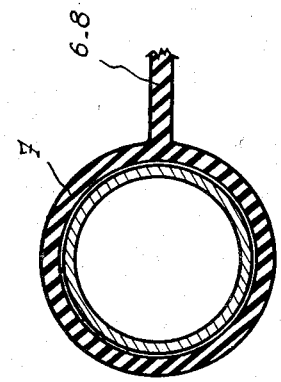
Fig. 2 is a sectional view on an enlarged scale along line 11—11 in Fig. 1.

The drawings illustrate by way of example a luggage rack having two carrier shelves. Secured to a vertical wall through any suitable means such as bolts, rivets or spot welding (not shown), are a pair of brackets 1. Each bracket 1 has one or more vertically extending sections secured to the wall and one or more forwardly jutting portions, herein two in number, for supporting the carrier assemblies now to be described.

Each carrier assembly comprises a flat plate or web 6 or 8 made from a suitable moulded plastic material, with or without reinforcements therein, and integrally formed along the opposite longitudinal sides of it with a pair of continuous sleeves or tubes 7, preferably provided as a unitary moulding with the web section or sheet 6.

Each sleeve 7 is freely slidable about a cylindrical member or tube 2a, 2b, 2c or 2d, which is preferably a metallic tube. Secured in and welded to the tube members at each end is a screw-threaded stud 4.

Supported on the brackets 1, and perhaps welded thereto, at suitably spaced points are annular bushings or rings 3 which are adapted to receive end portions of the tubes 2a, 2b, 2c and 2d therein. Retainer nuts 5 are screwable over the end studs 4 projecting beyond the ends of bushings 3 and are adapted to engage the outer end surfaces of said bushings to prevent withdrawal of the tubular members such as 2a.

The moulded carrier members including the webs 6 and integral sleeves 7 may be formed from any suitable thermoplastic material and may receive any suitable reinforcing members therein, as well as any suitable colour pigments to enhance the attractiveness of the assemblies.

What I claim is:

1. A baggage rack comprising spaced brackets each including an outwardly jutting portion, pairs of spaced rings on said portion in aligned relation, a solid flat sheet adapted to support the baggage, completely closed sleeves laterally connected to said sheet and integral therewith, said sheet being positioned in a diametral plane of said sleeves, said sleeves reinforcing said sheet, tubes slidably accommodated within said sleeves and extendible through said rings, threaded studs in said tubes, and nuts on said studs and sandwiching said rings against said sleeves.

2. A rack as claimed in claim 1 wherein each of said brackets comprises a further portion angularly disposed with respect to the first said portion and spaced beneath the same, a second sheet, sleeves laterally connected to the second sheet, tubes slidable in the latter said sleeves, threaded studs in the latter said tubes, rings spaced and aligned on the further portions to accommodate the latter said tubes, and nuts to engage the latter said studs and thus hold the second sheet in position.

References Cited in the file of this patent

UNITED STATES PATENTS

| | | |
|---|---|---|
| 584,811 | Caldwell | June 22, 1897 |
| 905,737 | McCombe | Dec. 1, 1908 |
| 923,721 | Smith | June 1, 1909 |
| 967,600 | Bernstein | Aug. 16, 1910 |
| 999,368 | Hamm | Aug. 1, 1911 |
| 2,487,301 | Borah | Nov. 8, 1949 |
| 2,541,898 | Watter | Feb. 13, 1951 |
| 2,639,817 | Ehret | May 26, 1953 |

FOREIGN PATENTS

| | | |
|---|---|---|
| 830,515 | Germany | Feb. 21, 1952 |